June 4, 1935.  F. O. ALBERTSON  2,003,570
METHOD OF MAKING VALVE SEAT TOOLS
Original Filed March 5, 1932  2 Sheets-Sheet 1
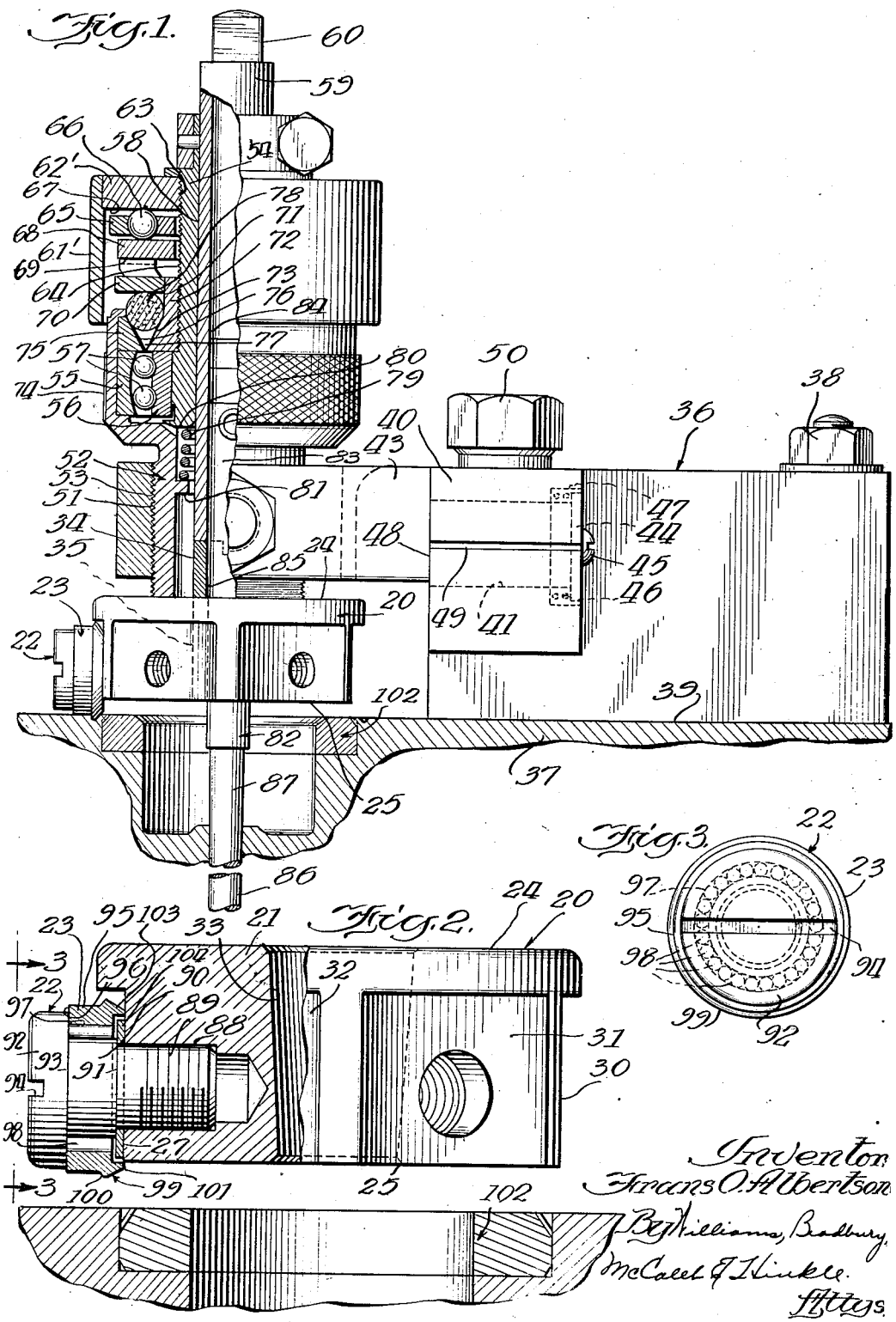

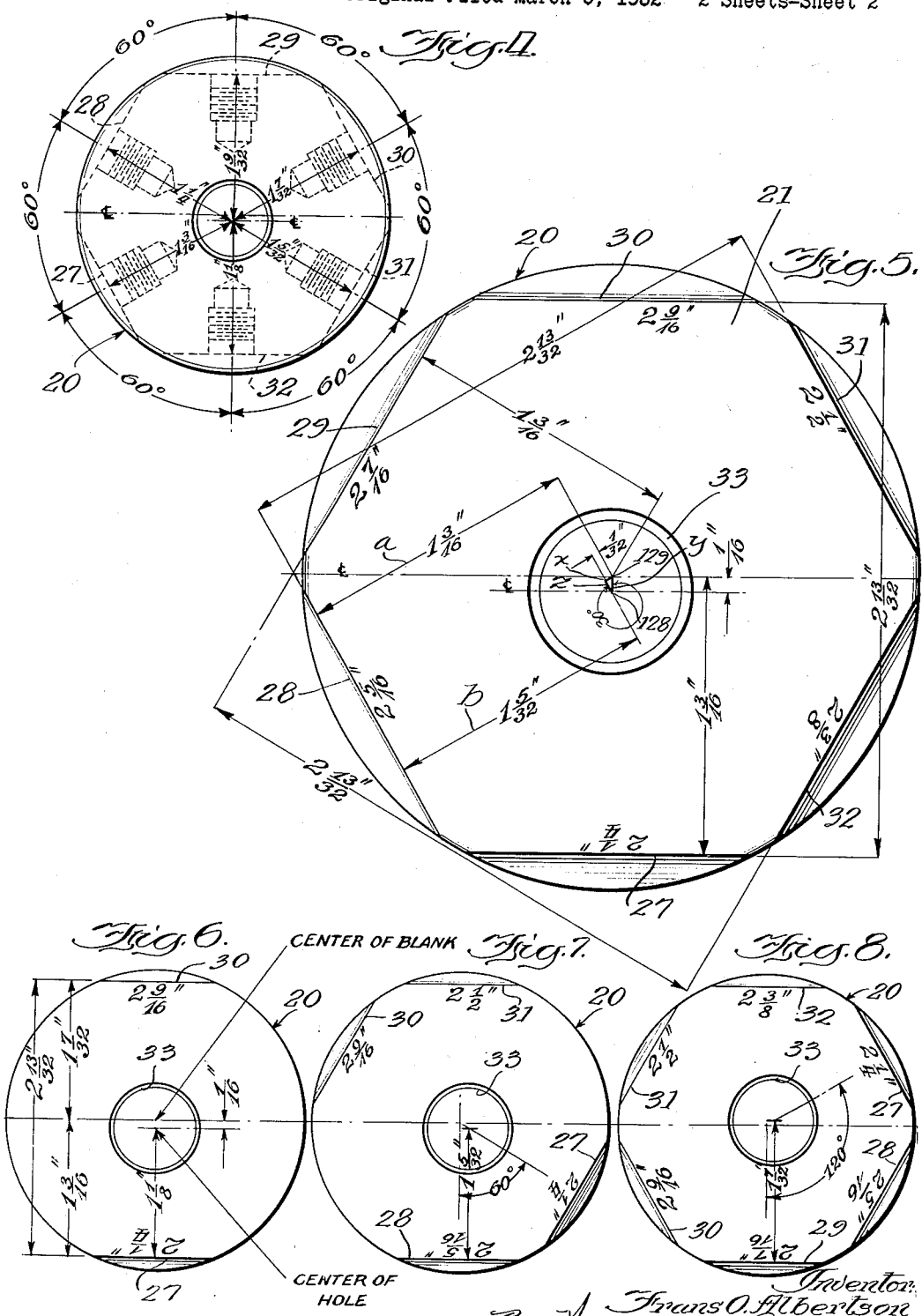

Patented June 4, 1935

2,003,570

UNITED STATES PATENT OFFICE 2,003,570

METHOD OF MAKING VALVE SEAT TOOLS

Frans O. Albertson, Sioux City, Iowa, assignor to Albertson & Company, Inc., Sioux City, Iowa, a corporation of Iowa Original application March 5, 1932, Serial No. 597,082. Divided and this application July 29, 1932, Serial No. 625,864

1 Claim. (Cl. 90—11)

The present invention relates to methods of making valve seat ring securing tools, and is particularly concerned with an improved method of making a tool of the type disclosed in my prior application, Serial No. 597,082, filed March 5, 1932, for Valve seat ring securing tools and method of making same, of which this application is a division.

The tool in question is peculiarly adapted to be used for securing new valve seat rings in the blocks of internal combustion engines. The tool may be used both for repairing and reconstruction of old valve seats or in the securement of special valve seats in internal combustion engines, wherever it is desirable that the seat be formed of different material from the metal of the engine block itself. It should also be understood that the present tool and method are of general application and may be used for securing valve seats in place in many structures or valves other than internal combustion engines, and I do not wish to be limited to any particular use.

The improved method of reconstructing valve seats, including the present method of securing the ring seat in place, is the subject of my prior application, Serial No. 580,967, filed December 14, 1931.

Pursuant to a requirement for division made by the Examiner, the improved tool has been made the subject of the parent application, and the present application relates particularly to the method of making the tool.

As an understanding of the type of tool is necessary to the understanding of the method of making the tool, the tool will now be described, as well as the problems sought to be overcome in the making and use of such a tool.

It is often desirable to provide a valve seat in an internal combustion engine, the metal of which has better characteristics than the material of which the internal combustion engine block is constructed. The valve seats are subjected to constant impact under high pressure and at high temperatures and, although considerable attention has been given in the prior art to the provision of valves capable of withstanding this hard usage, the valve seats of the prior art have not been capable of withstanding the hard usage to which they are subjected.

In my prior applications I have described the methods of securing the valve seat ring in place by the close frictional engagement between the periphery of the ring and the wall of a recess. Contemporary methods of securing these rings in place also include the formation of under-cut recesses or otherwise and the expanding of the valve seat rings into the recess by means of special tools.

Since a valve seat ring is generally made of hard and somewhat resilient metal, it is difficult, if not absolutely impossible, to expand the ring into close engagement with the walls of the recess at the periphery of the ring. As soon as the tool is removed from the expanding engagement with the ring, the ring inevitably contracts again slightly, drawing away from the walls of the recess, and such rings are not satisfactorily secured in the engine block. Rings which are secured by endeavoring to force or expand the ring into engagement with its recess become loose and permit leakage between the ring and the engine block and are the source of a great deal of trouble.

One of the objects of the present invention is the provision of an improved valve seat ring securing tool which is adapted to secure the valve seat ring in the engine block or the like so firmly that there is no possibility of leakage between the ring and the engine block and no possibility of loosening of the valve seat ring during the use of the engine or otherwise.

Another object of the invention is the provision of an improved valve seat tool and ring structure which are adapted to effect a firm securement between the ring and the engine block so that the ring is secured against rotation as well as any other movement and so that the rings may be installed expeditiously and economically.

Another object of the invention is the provision of an improved valve seat ring securing tool of the class described, particularly adapted for use on valve seats of a predetermined size, and the provision of an improved universal tool which may be used upon a multiplicity of different valve seats of different sizes, preferably including the most common standard sizes of valve seats.

Such a universal tool necessarily greatly reduces the cost of tools for working valve seats of various sizes and brings the tools within the range of a vast number of purchasers who could not afford to purchase an individual tool for each valve seat size.

Another object of the invention is the provision of an improved method of making universal valve seat tools of the class described, which enables the various parts of the tool to be formed very quickly and expeditiously upon the usual machinery and which greatly reduces the cost of the finished universal tool.

Another object of the invention is the provision of an improved universal tool, the dimensions and proportions of which have been so arranged that it is possible to provide a ring securing tool adapted to be used on a plurality of standard valve seats without the necessity for making individual cuts in the formation of the tool to adapt each part of the tool to a particular valve seat.

Referring to the drawings, of which there are two sheets,

Fig. 1 is an elevational view in partial section, showing the complete tool installation, including a valve seat fixture, pilot, roller tool, tool holder and automatic clutch;

Fig. 2 is an enlarged elevational view in partial section of a universal valve seat ring securing tool constructed according to the present invention, with the valve seat in enlarged secion;

Fig. 3 is an end elevational view of the roller and stud alone, taken on the plane of the arrows of Fig. 2, looking from the left;

Fig. 4 is a top plan view of the ring securing tool;

Fig. 5 is an enlarged bottom plan view of the tool body, including the dimensions and angles for the purpose of explaining how the dimensions and proportions of the tool may be determined mathematically so that the tool may be manufactured very expeditiously, and both of the opposite flat sides of the body may be cut at the same time when this feature of the invention is employed; and Figs. 6, 7 and 8 are full sized bottom plan views of the tool body, showing its shape during the successive steps in the manufacture of the body according to the preferred method.

Referring to Fig. 2, this is an enlarged elevational view in partial section, showing the preferred form of the valve seat ring securing tool and showing the valve seat ring after it has been placed in the recess, but before it has been secured by means of the present tool. The valve seat tool, which is indicated in its entirety by the numeral 20, preferably includes a body 21 constructed of hardened metal such as steel for supporting one or more roller studs 22 which rotatably support the rollers 23.

The body 21 comprises a substantially cylindrical metal member, which may be provided with a flat upper surface 24 and a flat lower surface 25. In the case of the individual tool shown in Figs. 4 and 5 and intended to be used only on one particular size of valve seat, the periphery 26 of the tool body may be substantially cylindrical, except for the provision of a flat surface 27 at one side. In the case of the universal tool, the body 21 is provided with a multiplicity of flat surfaces 27—32 located about its periphery for supporting rollers 23 at various distances from the axis of the tool in order to secure valve seat rings of different sizes.

The tool body 21 is preferably provided with a centrally located downwardly tapered bore 33 and is adapted to be secured upon a tool holder 34 by the wedging engagement of the complementary frusto-conical surface 35 of the tool holder in the tapered bore 33.

Referring to Fig. 1, the complete tool installation preferably includes the fixture 36, which may be secured to the engine block 37 by means of nuts and the usual stud bolts 38 which project from the engine block. The fixture 36 is provided with a substantially flat lower surface 39 and with a laterally projecting lug 40 having a transverse bore 41 for receiving a trunnion 42.

The trunnion 42 is carried by a metal collar 43 and is mounted for rotation in the bore 41, being secured in place by a washer 44 carried by the end of the trunnion 42 and secured thereto by screw bolt 45. A compression spring 46, tensioned between the base of counterbore 47 and washer 44, urges the flat surface 48 of collar 43 into engagement with the complementary surface on the fixture 36 and tends to hold the collar in any predetermined rotative position.

The transverse lug 40 may be split at 49 and provided with a screw bolt 50 which passes through the upper part of the lug 40 and is threaded into the lower part of the lug so as to clamp the two portions together on the trunnion to secure the fixture in any predetermined position.

The collar 43 has a vertically extending threaded bore 51 which is adapted to receive the adjustable feed screw 52 which is provided with a complementary threaded surface 53. The feed screw and its associated structure may be substantially as described in my prior application, Serial No. 551,310 filed July 17, 1931, but it should be noted that the guide 54 of the feed screw is supported for universal movement with respect to the feed screw by means of the races 55, 56 and ball bearings 57. The guide 54 is provided with a cylindrical bore 58 for slidably receiving a tool shaft 59 having a non-circular upper end 60.

The driving mechanism preferably includes a casing 61', the upper end 62' of which is provided with a threaded bore 63, engaging the threaded outer surface 64 of the guide 54. Within the casing 62 there is located a race 65 including a multiplicity of ball bearings 66, the upper side of which engages the lower flat surface 67 of the end wall 62'.

The ball bearings 66 also engage the lower annular race 68, which in turn engages a spring 69, the spring engaging an annular clutch member 70. The clutch member 70 is slidably supported upon the cylindrical portion 71 of the collar 72, which is also provided with a frusto-conical surface 73. The screw casing 74 includes a clutch ring 75 fixedly supported therein and provided with a frusto-conical surface 76. The frusto-conical surfaces 73 and 76 form an annular V groove 77 adapted to receive a leather clutch ring 78.

The compression spring 70 urges the guide 54 upward and takes up the backlash between the guide 54 and the screw 52. Compression spring 79 is compressed between the end 80 of the guide 54 and an annular flange 81 in the screw 52.

The installation preferably includes a valve stem pilot 82, which is provided with an upper cylindrical portion 83 which is adapted to be received in the cylindrical bore 84 in the drive shaft 59. The cylindrical portion 83 of the pilot stem 82 also passes through the cylindrical bore 85 in the tool holder 34. The pilot stem is also preferably provided with a lower cylindrical portion 86 which accurately fits the valve stem guide and with a frusto-conical portion 87 which is so gradually tapered that it may be wedged into the upper part of the valve stem guide to secure the pilot in fixed position in the guide merely by this wedging engagement.

Referring again to Fig. 2, each of the flat surfaces 27 to 32 of the tool body 21 is preferably provided with a centrally located threaded bore 88. The threaded bore 88 is adapted to receive the complementary threaded end 89 of the roller stud 22.

The roller stud 22 is preferably formed with an enlarged cylindrical bearing portion 90 and an annular shoulder 91 for definitely determining the position of the roller stud in the body 21. The roller stud 22 is also provided with a head 92 having a lower flat surface 93 adapted to act as a thrust bearing for the roller 23. The head 92 may be non-circular, or it may be provided with a slot 94 for receiving a screw driver in securing the stud in place.

The roller 23 comprises a substantially cylindrical metal member in the embodiment of Fig. 2, which is provided with an externally cylindrical surface 95 and a substantially flat end 96 engaging the annular shoulder 93 of the head 92. The roller 23 is provided with an inner cylindrical surface 97 or a cylindrical bore of sufficient size so that a plurality of roller bearings 98 may be interposed between the inner cylindrical surface 97 and the cylindrical surface 90 of the stud 22.

The roller bearings 98 and the roller 23 are, of course, constructed of the best hardened and tempered tool steel, accurately machined to shape. At its inner end the roller 23 is preferably provided with a radially projecting rib 99, one side of which is formed with a surface 100, which may be of abrupt slope or at substantially right angles to the axis of the roller 23. The other side 101 of the rib 99 is preferably gradually tapered, as shown in Fig. 2, in such a manner that the rib 99 is adapted to spin or force the metal of the engine block 37 over and above the valve seat ring 102, as shown in Fig. 1.

The roller 23 is preferably formed with a counterbore 103 for receiving a washer 104 which may be clamped between the annular shoulder 91 and the flat surface 27. The thickness of the washer 104 may be used to determine the relative play between the roller 23 and the roller stud 22, and the washer 104 may retain the roller bearings 98 in place on the stud 22.

The substantially cylindrical surface 95 on the roller 23 is adapted to come into engagement with the engine block 37 as soon as the rib 99 has been worked into the engine block to a predetermined depth. The cylindrical surface 95 on roller 23 thus constitutes a stop surface for predetermining the depth of groove which will be formed by the rib 99 and for determining when the operation of securing the valve seat ring has been completed.

The method to which the present application relates is particularly concerned with the universal type of tool which is illustrated in the figures of the drawings. The term "universal" is used in the sense of a tool which is applicable to a multiplicity of valve seat rings of different sizes, but the provision of a multiplicity of positions for the same stud and roller.

If desired, additional studs and rollers of different sizes and proportions may be provided with the same tool for accomplishing various different results.

In each one of the different embodiments of rollers described, it will be noted that there is a rib which is adapted to work the metal out of the engine block over above the valve seat ring, but after the rib has reached a predetermined depth there is a curved stop surface on the roller which prevents the roller from being pressed into a greater depth.

The tool is adapted to be used as shown in Fig. 1 for securing the valve seat ring 102 in place by forcing the metal of the block out over the top of the ring. I shall now describe in detail the improved method of making the universal tool.

Referring to Figs. 5 to 8, these are diagrammatic views showing the bottom of the tool body in various stages of its manufacture for the purpose of explaining the preferred method of constructing the tool. The various sizes which have been selected for standard valve seat ring sizes are merely exemplary of one set of proportions which may be used. These sizes will take care of most of the modern internal combustion engines used upon automobiles. For example, the sizes used for one ring securing tool are one and seven-eighths, one and thirteen-sixteenths, one and fifteen-sixteenths, two and one-sixteenth, two and one-eighth and two inches.

In the embodiment selected to illustrate the invention, the ring sizes which would be stamped upon the lower face of the ring securing tool, as shown in Fig. 5, are two and one-fourth, two and five-sixteenths, two and seven-sixteenths, two and nine-sixteenths, two and one-half, and two and three-eighths.

These sizes correspond substantially to the external diameter of the ring to be secured and the radius extending from any predetermined flat face to the center of the tool is one-half of the size stamped adjacent that flat surface. Thus the flat side which is used to support the stud and roller, when operating with a two and one-fourth inch ring, is one and one-eighth or one and four-sixteenths inches from the center of the tool.

The flat surfaces 27—32 respectively are preferably arranged at angles of sixty degrees to each other for the reason that it is possible with this predetermined angularity to manufacture the tool body according to an improved method which has distinct advantages from the point of view of saving of time and labor.

In the embodiment illustrated in Fig. 5 the distance between the opposed flat surfaces 27 and 30, 28 and 31, 29 and 32 is equal in every case to two and thirteen thirty-secondths inches. This makes it possible to straddle-mill the flat surfaces two at a time, and the formation of the surfaces may be made without the necessity for adjusting cutters in any way and by merely turning a tool body blank through an angle of sixty degrees to bring it into position for the next cut.

In order to accomplish this result the tool body blank 21 is preferably supported upon an eccentric arbor which is carried by the usual dividing head. The dividing head is so arranged that by rotating its crank the tool blank 21 may be brought into any of a plurality of rotative positions at an angular displacement of sixty degrees from each other by the use of the dividing head.

Since it is desired to provide flat surfaces located at varying radii, differing by an amount of one thirty-secondth of an inch from each other, the axis of the eccentric portion of the arbor should preferably be two thirty-secondths or one sixteenth of an inch from the true center of the axis of the dividing head and of the bore 33.

Referring to Fig. 5, the true center of the bore 33 and body 21 is indicated by the numeral 128. The eccentric center about which the body 21 is rotated during its manufacture is one sixteenth of an inch higher up and is indicated by the numeral 129, although the flat surface 27 is one and one eighth or one and two sixteenths inches from the true center 128. It would, therefore, be one and two sixteenths plus one sixteenth, or one and three sixteenths inches from the eccentric center 129. The opposite flat surface 30 is one and nine thirty secondths from the true center 128, or one and seven thirty-secondths from the eccentric center 129.

Referring to Fig. 6, the blank is first secured in proper position on the eccentric arbor of the dividing head and the opposed surfaces 27 and 30 are formed by straddle-milling these two surfaces at the same time, with the milling cutters disposed two and thirteen thirty secondths inches apart.

The blank is then rotated counterclockwise from the position of Fig. 6 to that of Fig. 7 through an arc of sixty degrees, and the eccentric mounting of the blank will displace the blank with respect to the milling cutters in such a manner as to locate them for the formation of the flat surfaces 28 and 31 the same distance apart but at different radii from the true center of the blank.

The flat surface 28 is intended to be used with two and five sixteenths inch rings, and should therefore be at a radius of one and five thirty secondths inches from the true center. The blank is, however, being rotated upon the center 129, which is one and three sixteenths inches from the cutter, which will form the surface 28. When the blank is rotated on this eccentric center 129 through an angle of sixty degrees, it will be noted that the true center will move into a position closer to the cutter which is adjacent the side 28.

Referring to Fig. 5, the difference in distances between the flat side 28 and the true center and the flat side 28 and the eccentric center is shown by the dimension lines A and B. The small triangle shown at the center of this diagram has a hypotenuse of one-sixteenth of an inch, and the short side, which represents the difference between the radii and the surface 28, is equal to one thirty secondth of an inch. This is true because the sine of thirty degrees is equal to one half.

This relation is easily proved by referring to the usual trigonometric formula. The sides of the small triangle may be designated by the letters X, Y and Z.

$$\frac{X}{Y} = \text{cosine } 60° = \text{sine } 30° = \tfrac{1}{2}.$$

$$Y = \tfrac{1}{16}. \qquad X = \tfrac{1}{2} \text{ times } \tfrac{1}{16} = \tfrac{1}{32}.$$

The flat surface 28 will, therefore, be at a distance of one and three-sixteenths less one thirty-secondth or one and five thirty-secondths inches from the true center. The side 31 will be one and eight thirty-secondths from the true center.

It will thus be observed that the rotation of sixty degrees of the blank on an eccentric axis shortens the radius to the flat surface 28 by one thirty-secondth of an inch and increases the radius to the flat surface 31 by one thirty-secondth of an inch.

Referring to Fig. 8 this is a diagrammatic view showing the third step in the manufacture during which the sides 29 and 32 are formed. The rotation of the blank sixty degrees further counter-clockwise for this operation causes the surface 29 to be formed at a radius of one and seven thirty-secondths inches and the surface 32 to be formed at a radius of one and six thirty-secondths from the true center.

By adding together the respective distances or radii of the opposite flat surfaces from the true center, it will be observed that the opposite flat surfaces are always the same distance apart and that by the use of an eccentric axis for rotation of the blank during the manufacture, the radii of the respective supporting surfaces for the rollers may be varied as desired. By rotating the blank through angles of sixty degrees and using an eccentricity which is twice the variation in radius desired, the proportions may be made such that the flat surfaces may be straddle-milled on opposite sides at the same time without any adjustment of the cutters.

It is thus possible to manufacture the universal tool of the type shown in Figs. 2 and 5 very expeditiously at a very low cost, and the dimensions and proportions 12 of the parts of the tool as described are a very important feature of the invention.

The tool may be constructed at a greater cost by forming each of the flat surfaces separately at a predetermined radius, but the device may be produced in large quantities very economically by the use of the improved method. In brief, therefore, the improved method of making the tool comprises the formation of a blank, the support of the blank upon an eccentric axis, the simultaneous cutting of flat surfaces on the opposite sides of the blank, the rotation of the blank through an angle of sixty degrees on an eccentric axis, the eccentricity of which is equal to twice the variation in radius desired, the formation of additional flat surfaces simultaneously on opposite sides with the blank in this position, etc. The flat surfaces are provided with bores for supporting the rollers at predetermined radii from the true center, and it is thus possible to provide a universal tool at a fraction of the cost which would be involved if it were necessary to form each of the flat surfaces separately at a different radius with a different adjustment.

The operation of the improved tool will be apparent from the description of the construction and characteristics of its parts, and therefore will not be described in detail in this application.

It will thus be observed that I have invented an improved valve seat ring securing tool and a tool installation by means of which valve seat rings may be more uniformly secured in place than is possible with the devices of the prior art. The present valve seat ring securing tool is capable of economical manufacture, and may be provided in the universal form so that it is capable of taking care of valve seat rings of various different sizes.

The valve seat rings which are secured with the present tool are so firmly secured that there is no possibility of the rings becoming loose nor any possibility of leakage between the ring and the engine block. As distinguished from devices and methods which purport to expand the ring, the present tool works upon the metal of the engine block, which is of such a character that it is capable of being worked into position without springing back, as would be the case where an effort was made to expand the ring into the recess in the block.

According to the present method of making valve seat tools, a single block may be very quickly formed with the flat surfaces located at the different radii necessary to take care of all of the different sizes of valve seat rings. The blank is supported upon an eccentric axis and rotated through an angle of sixty degrees between each cutting operation, and two of the flat surfaces located on directly opposite sides of the blank are formed at the same time. By virtue of the predetermined eccentricity and the rotation of the blank through a predetermined angle of sixty degrees between each cutting operation, the radii from the flat surfaces to the true center are varied in a predetermined manner, as previously described, resulting in the production of an improved universal tool having a much greater field of application than the tools used for a single size.

While I have illustrated and described a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim is new and desire to secure by Letters Patent of the United States, is:

In the manufacture of a rotatable body adapted to hold a tool at any one of six different distances from the center of rotation of such body by means of plane surfaces at such different distances, the method of forming such a body comprising forming a blank having means for securing the blank for rotation about its true center, supporting the blank upon an eccentric axis, said axis being parallel to and at a predetermined distance from the true center of the blank, forming a pair of opposed surfaces on the periphery of said blank by means of a pair of opposed cutting tools fixed at predetermined different radii from the true center of the blank and at right angles to a line joining the true center and eccentric axis, rotating the blank through an angle of 60° on the eccentric axis, forming a second pair of opposed plane surfaces on the periphery of the blank without altering the distance between the eccentric axis and the cutting tools whereby said second pair of surfaces will each be at a distance from said true center varying by one-half the eccentricity from the distance of said first pair of surfaces from the true center, again further rotating the blank through an angle of 60° on the eccentric axis and forming a third pair of opposed plane surfaces on the periphery of the blank without altering the distance between the eccentric axis and the cutting tools, whereby said third pair of surfaces will each be at a distance from said true center varying by one and one-half times the eccentricity from the distance of said first pair of surfaces from the true center.

FRANS O. ALBERTSON.